United States Patent
Zha

(10) Patent No.: US 10,317,692 B2
(45) Date of Patent: Jun. 11, 2019

(54) STEREOSCOPIC DISPLAY FOR NAKED EYES

(71) Applicant: Wuhan China Star Optoelectronics Technology Co., Ltd., Wuhan, Hubei (CN)

(72) Inventor: Guowei Zha, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 20 days.

(21) Appl. No.: 15/204,884

(22) Filed: Jul. 7, 2016

(65) Prior Publication Data
US 2017/0285360 A1 Oct. 5, 2017

(30) Foreign Application Priority Data
Apr. 5, 2016 (CN) .................. 2016 1 0208007

(51) Int. Cl.
| | |
|---|---|
| *G02F 1/29* | (2006.01) |
| *G02B 27/26* | (2006.01) |
| *G02B 27/22* | (2018.01) |
| *G09G 3/00* | (2006.01) |
| *G09G 3/3208* | (2016.01) |
| *H04N 13/302* | (2018.01) |

(52) U.S. Cl.
CPC ......... *G02B 27/26* (2013.01); *G02B 27/2214* (2013.01); *G09G 3/003* (2013.01); *G09G 3/3208* (2013.01); *H04N 13/302* (2018.05); *G02F 2001/294* (2013.01)

(58) Field of Classification Search
CPC ............... G02B 27/26; G02B 27/2214; G02F 1/133528; G02F 1/1368; G02F 2001/294; G09G 3/003; G09G 3/3208; H04N 13/302
See application file for complete search history.

(56) References Cited

U.S. PATENT DOCUMENTS

| | | | | |
|---|---|---|---|---|
| 2007/0177086 A1* | 8/2007 | Ishitani | ............. | G02F 1/133528 349/117 |
| 2007/0182885 A1* | 8/2007 | Egi | ................... | G02F 1/133528 349/96 |
| 2013/0342512 A1* | 12/2013 | Smith | .................. | G09G 3/3406 345/204 |
| 2014/0240625 A1* | 8/2014 | Kim | ....................... | G02B 5/201 349/15 |
| 2015/0138455 A1* | 5/2015 | Liao | ................... | G02B 27/2214 349/15 |

* cited by examiner

Primary Examiner — Charles S Chang
(74) Attorney, Agent, or Firm — Andrew C. Cheng

(57) ABSTRACT

The present application discloses a stereoscopic display for naked eyes includes a two-dimensional display panel, a stereoscopic module for the naked eyes and a light converting module. The stereoscopic module for the naked eyes is deposited between the two-dimensional display panel and the light converting module. The two-dimensional display panel is used to output a two-dimensional image based on the linearly polarized light; the stereoscopic module for the naked eyes is used to output a three-dimensional image based on the linearly polarized light. The light converting module is used to convert the linearly polarized light to a circularly polarized light and output a three-dimensional image based on the circularly polarized light.

13 Claims, 3 Drawing Sheets

STEREOSCOPIC DISPLAY FOR NAKED EYES

FIELD OF THE INVENTION

The present application relates to a display technology field, and more particularly to a stereoscopic display for naked eyes.

BACKGROUND OF THE INVENTION

A new dimension is introduced in the stereoscopic display technology in the basis of the flat panel display technology; the three-dimensional display is formed and closer to the real world perception and become the popular in the electronic display technology in recent years.

The current mainstream of the stereoscopic display for naked eyes is mainly based on a Liquid Crystal Display, LCD or an organic Light-Emitting Diode, OLED display, wherein the LCD display is mainly based on the polarized light control technology, and OLED display is for filtering the influence of the reflecting light from the ambient light through the backside electrode, a quarter-wave plate and a polarizer are placed on the display panel. So whether is the LCD or the OLED displays are based on the output of the linearly polarized light. The stereoscopic display technology for naked eyes are adapted and based on the vision cheating technology by the binocular parallax, the linearly polarized light emitting from the LCD or OLED display is split, to form a stereoscopic display effect. However, this stereoscopic display technology for naked eyes based on the linearly polarized light is easy to cause the human visual fatigue and visual disturbances, and affect people's visual health.

SUMMARY OF THE INVENTION

The present invention to solve the technical problem is to provide a stereoscopic display for naked eyes to relieve the visual fatigue and visual disturbances problems caused by the conventional linear polarized light of the stereoscopic display for naked eyes.

In order to solve the above technical problems, one technology approach of the present application is to provide a stereoscopic display for naked eyes, including:

a two-dimensional display panel, a stereoscopic module for the naked eyes and a light converting module, wherein the stereoscopic module for the naked eyes is deposited between the two-dimensional display panel and the light converting module;

the two-dimensional display panel is used to output a two-dimensional image based on the linearly polarized light;

the stereoscopic module for the naked eyes is used to output a three-dimensional image based on the linearly polarized light; and the light converting module is used to convert the linearly polarized light to a circularly polarized light and output a three-dimensional image based on the circularly polarized light.

Wherein light converting module further including at least one quarter-wave plate, and the quarter-wave plate convert the linearly polarized light to a circularly polarized light.

Wherein the light converting module further including an adhesive layer, a first protective layer, a quarter-wave plate, a half-wave plate, and a second protective layer sequentially laminated.

Wherein the difference of the refractive index of the quarter-wave plate is positively correlated with the wavelength of the linearly polarized light.

Wherein the light converting module is a liquid crystal type circularly polarization controller and the liquid crystal type circularly polarization controller further including a voltage control circuit and a liquid crystal cell;

the voltage control circuit is modulated the voltage of the liquid crystal cell to convert the inputted linearly polarized light into a circularly polarized light by the liquid crystal cell.

Wherein light converting module is a slit, a cylindrical lens or a liquid crystal lens.

Wherein the two-dimensional display panel is a LCD display, and the LCD display including a backlight module, a first polarizer, a first substrate, a liquid crystal layer, a second substrate, a second polarizer;

The first polarizer is positioned between the backlight module and the first substrate; the second polarizer is located between the second substrate and the stereoscopic module for naked eyes; and the liquid crystal layer is filled between the first substrate and the second substrate.

Wherein the first substrate is a thin-film transistor, TFT array substrate and the second substrate a color filter substrate.

Wherein the two-dimensional display panel is an OLED display, a quarter-wave plate and a polarizer;

The quarter-wave plate is disposed between the OLED display and the polarizer;

Wherein the OLED display including a substrate, an anode, a conductive layer, an emission layer and a cathode stacked in this order.

Comparing to conventional technology, the advantage of the present application of the stereoscopic display for naked eyes includes a two-dimensional display panel, a stereoscopic module for the naked eyes and a light converting module. The stereoscopic module for the naked eyes is deposited between the two-dimensional display panel and the light converting module. The two-dimensional display panel is used to output a two-dimensional image based on the linearly polarized light; the stereoscopic module for the naked eyes is used to output a three-dimensional image based on the linearly polarized light. The light converting module is used to convert the linearly polarized light to a circularly polarized light and output a three-dimensional image based on the circularly polarized light. By the process mentioned above to add the light converting module added to the base of the conventional stereoscopic display for the naked eyes. The linearly polarized light output from the conventional stereoscopic display for the naked eyes is changed into circularly polarized light to simulate natural light with completely unpolarized state, thus alleviating the human visual fatigue and visual disturbances and achieve a healthy eye.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
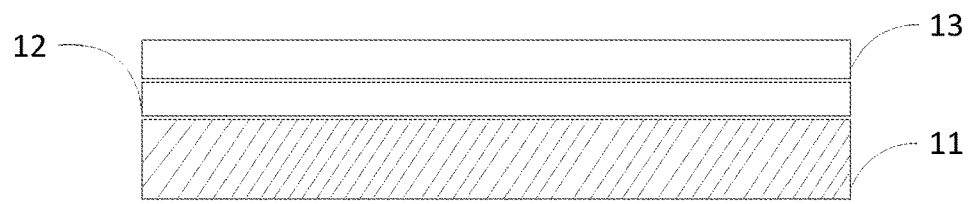
FIG. 1 is a schematic view of the structure of the stereoscopic display for naked eyes according to the first embodiment of the present application.

Referring to FIG. 1, the structure of the stereoscopic display for naked eyes according to the first embodiment of the present application includes:

A two-dimensional display panel 11, a stereoscopic module for the naked eyes 12 and a light converting module 13, the stereoscopic module for the naked eyes 12 is deposited between the two-dimensional display panel 11 and the light converting module 13.

The two-dimensional display panel 11 is used for outputting two-dimensional image based on the linear polarized light; the stereoscopic module for the naked eyes 12 is for outputting a three-dimensional image based on the linearly polarized light; the light converting module 13 is for converting the linearly polarized light into a circularly polarized light and to output a three-dimensional image based on the circularly polarized light.

In particular, the current mainstream of the two-dimensional display panel 11 is LCD display or OLED display. The LCD display is based on polarized light control technology, the light emitted from the backlight module is filtered by a polarizer and into the liquid crystal layer. The polarization of the light is selectively converted by the liquid crystal layer according to the image content, the converted light is further transmitted or obscured by the filter of the polarizer, the transmitted light passed into the stereoscopic module for the naked eyes 12. From this, the light entered into the stereoscopic module for the naked eyes 12 is linearly polarized light. The OLED display is a self light-emitting organic electroluminescent device, the light emitted from the OLED display is not a polarized light which is closer to a natural light. But in order to filter the impact of reflected light from the ambient light through the cathode of the OLED display (also known as the back electrode), a polarizer is usually required and placed on top of the OLED display. The light emitted by the OLED display, pass the polarizer and output a linearly polarized light, so the light enters the stereoscopic module for the naked eyes 12 is remains a linearly polarized light.

The stereoscopic module for the naked eyes 12 is a slit, a cylindrical lens or a liquid crystal lens, by splitting the linearly polarized light outputted by the two-dimensional display panel 11 to achieve a three-dimensional image output of the left and right eye, the light passing the stereoscopic module for the naked eyes 12 is still a linearly polarized light.

Figure 2:
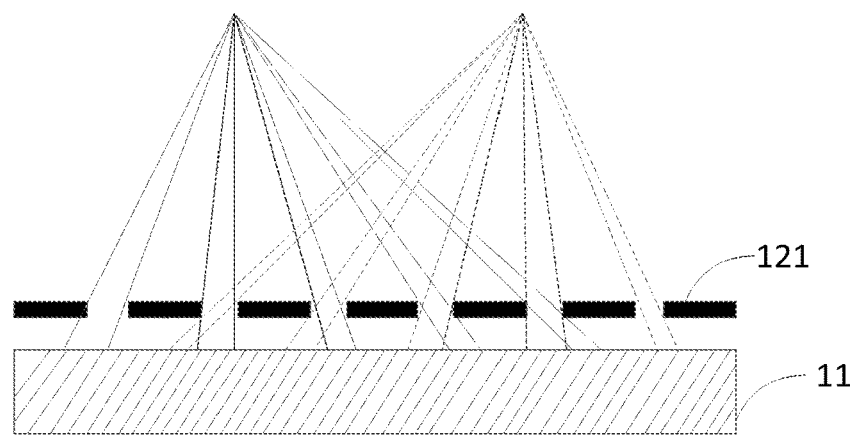
FIG. 2 is a principle diagram illustrated the slits of the stereoscopic display for naked eyes according to the first embodiment of the present application.

Wherein, as shown in FIG. 2, the stereoscopic module for the naked eyes 12 is a slit 121, the split process is as followed: a slit 121 with a suitable parameter is placed in front of the two-dimensional display panel 11. The two dimensional image content with a specific parallax occlusion and output from the two-dimensional display panel 11 is selectively sheltered. After a certain distance, the light reaches the human eye can be separated. The eyes receive two images with parallax, and the three-dimensional effect is produced.

Figure 3:
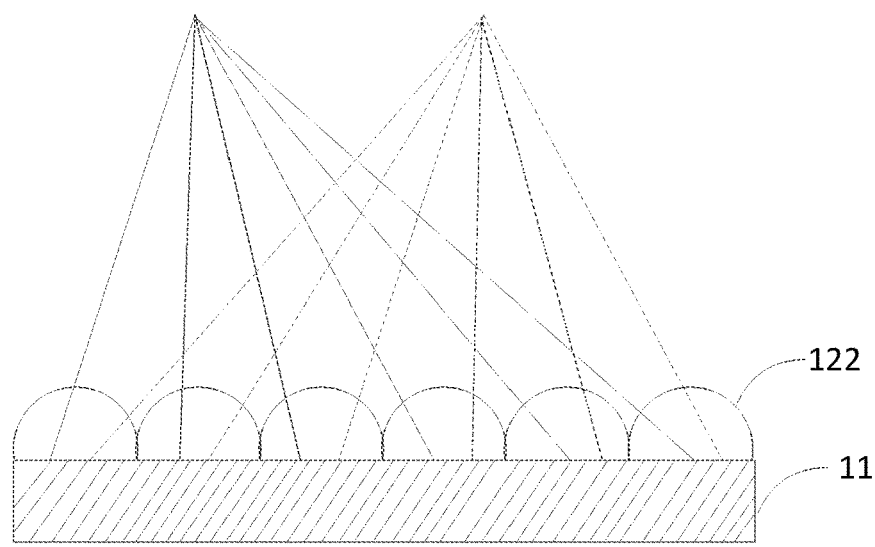
FIG. 3 is a principle diagram illustrated the cylindrical lens of the stereoscopic display for naked eyes according to the first embodiment of the present application.

As shown in FIG. 3, the stereoscopic module for the naked eyes 12 is a cylindrical lens 122, the split process is as followed: The principle of the cylindrical lens 122 is similar to the slit 121. By the light refraction of the cylindrical lens 122, the two dimensional image content with a specific parallax occlusion and outputted from the two-dimensional display panel 11 is refracted to different place in the air, the image content reaches the human eye is separated. The eyes receive two images with parallax, and the three-dimensional effect is produced.

The liquid crystal lens is based on the single optical axis and the birefringent properties of the liquid crystal to produce. The liquid crystal lens is controlled by the electric signal. By controlling the input of the voltage to the liquid crystal lens or not, two-dimensional/three-dimensional state transition can be achieved.

Therefore, the linear polarized light output from the two-dimensional display panel 11 passes the slit, the cylindrical lens or the liquid crystal lens to achieve split light and make the left eye and the right eye to receive two images with parallax, No light is phase transformed or other process, so the light passed the stereoscopic module for the naked eyes 12 is still a linearly polarized light.

In other embodiments, the stereoscopic module for the naked eyes 12 can also use other implementation structure and implementation, in order to achieve the transition of the two-dimensional to the three-dimensional image, and is not limit to the above-mentioned three kinds of the stereoscopic module for the naked eyes 12, and the stereoscopic module for the naked eyes 12 can also include some auxiliary elements.

One important direction of the display technology is reproducing the way that human cognitive the world. In general, the human eye perceives information mainly through the natural light with completely non-polarization light. The more the light is close to the natural light, the less damage to the human eye. Within the polarization light, the polarization property of the circularly polarized light is closest to the natural light.

In the conventional stereoscopic display for naked eyes, after the two-dimensional image through the conversion of the stereoscopic module for naked eyes to a three-dimensional image, the image is direct outputting to reach the human eye. The three-dimensional image based on the linearly polarized light is perceived by the human eye. The relevant objective and subjective experiments have revealed an impact of the linearly polarized light to the human visual fatigue and visual impairment. Therefore, if the three-dimensional image of linearly polarized light is changed into circularly polarized light, and the circularly polarized light is directly perceived by the human eye, the visual fatigue caused by light will be greatly eased, and is conducive to visual health.

In this embodiment, a light conversion module 13 is added basing on the conventional stereoscopic display for naked eyes. The light conversion module 13 converts the linearly polarized light into the circularly polarized light to output a three-dimensional image based on the circularly polarized light.

Figure 4:
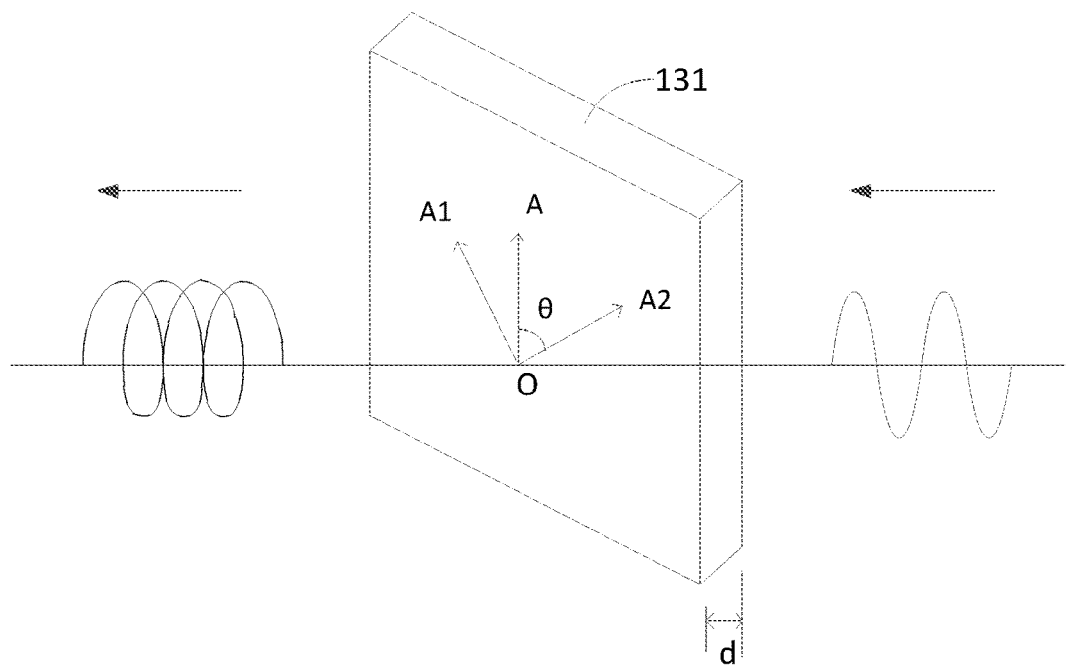
FIG. 4 is a principle diagram illustrated the stereoscopic module for the naked eyes of the stereoscopic display for naked eyes according to the first embodiment of the present application.

At least one quarter-wave plate 131 is selected as a light conversion module 13. As shown in FIG. 4, when the linearly polarized light perpendicular incident into the quarter-wave plate 131, and the angle θ between the polarization direction of the light (as the direction along the OA direction shown in FIG. 4) and the optical axis direction of the quarter-wave plate 131 (as the direction along the OA2 direction shown in FIG. 4) is 45°, the outputting light is a circularly polarized light. In this embodiment, the quarter-wave plate satisfies the phase delay formula:

$$\frac{2\pi}{\lambda} * \Delta n * d = \frac{\pi}{2}, \text{ such as } \Delta n = \frac{\lambda}{4*d}$$

Where λ is the wavelength of the linearly polarized light, Δn is the difference of the refractive index, d is the thickness of the quarter-wave plate.

Figure 5:
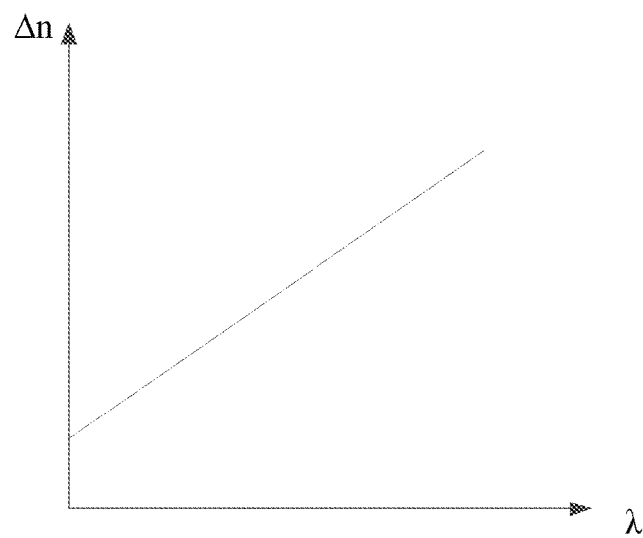
FIG. 5 is a dispersion characteristic diagram of the quarter-wave plate of the stereoscopic display for naked eyes according to the first embodiment of the present application.

In order to achieve the conversion of the linear polarized light in all wavelength range into a nearly ideal circularly polarized light, the difference of the refractive index of the quarter-wave plate is positively correlated with the wavelength. With the increasing of the wavelength, it will have the dispersion characteristics of the reverse wavelength, as shown in FIG. 5.

In can be understood that, the two-dimensional image based on the linearly polarized light is outputted by the two-dimensional display panel 11 of the stereoscopic display for naked eyes in the first embodiment of the present invention, and by pass the stereoscopic module for the naked eyes 12 to output the three-dimensional image based on the linearly polarized light. The linearly polarized light is further pass the light conversion module 13 to output the three-dimensional image based on the circularly polarized light. In this way, the human eye direct perception of circularly polarized light close to natural light, to alleviate the human visual fatigue and visual disturbances, achieve a healthy eye.

Figure 6:
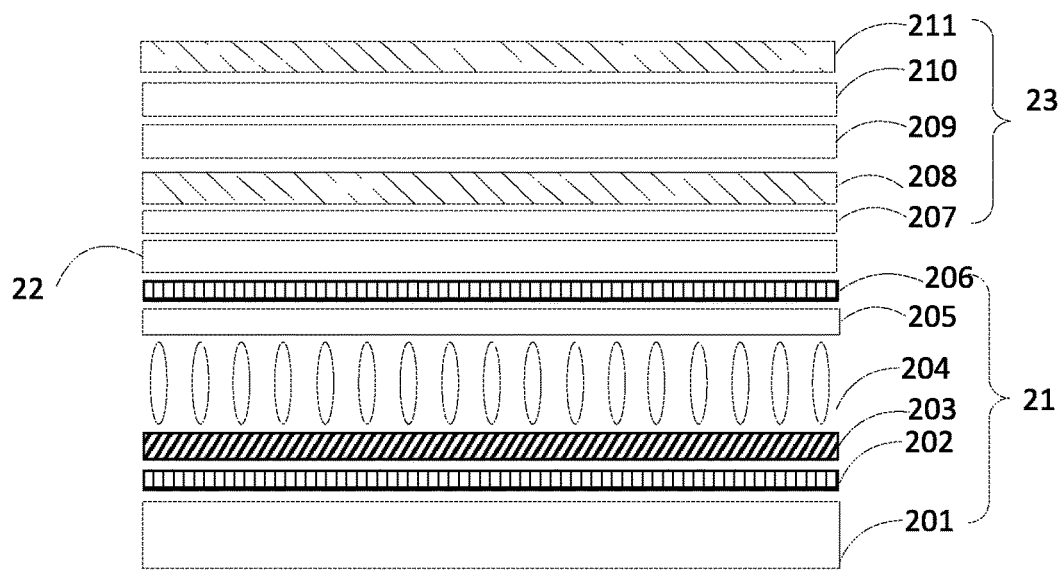
FIG. 6 is a schematic view of the structure of the stereoscopic display for naked eyes according to the second embodiment of the present application.

Referring to FIG. 6, is a stereoscopic display for naked eyes according to the second embodiment of the present application including a two-dimensional display panel 21, a stereoscopic module for naked eyes 22 and a light conversion module 23.

In particular, in this embodiment, the two-dimensional display panel 21 is a LCD display 21. The LCD display 21 includes a backlight module 201, a first polarizer 202, a first substrate 203, a liquid crystal layer 204, a second substrate 205, a second polarizer 206.

The first polarizer 202 is positioned between the backlight module 201 and the first substrate 203. The second polarizer 206 is located between the second substrate 205 and the stereoscopic module for naked eyes 22. The liquid crystal layer 204 is filled between the first substrate 203 and the second substrate 205. The first polarizer 202 and the second polarizer 206 control the backlight module 201 and the liquid crystal layer 204 to output the polarized light, wherein the first substrate 203 is selected as a thin-film transistor, TFT array substrate 203 and the second substrate 205 is selected as a color filter substrate 205.

The Light emitted from the backlight module 201 is passing through the first polarizer 202 and enters into the liquid crystal layer 204. The liquid crystal layer 204 is located between the TFT substrate 203 and the CF substrate 205. By the driving of the electric field, the liquid crystal molecules are twisted nematic in order to achieve the control of the polarization state of light, these light is filter by the CF substrate 205, and then through the second polarizer 206 and injected outward, thus forming a two-dimensional image. For example, in the absence of the electric field, the light emitted from the backlight module 201 passing through the first polarizer 202 and passes the liquid crystal layer 204. Under the action of the liquid crystal layer 204, the light is rotated by a certain angle, when leaving the liquid crystal layer 204, the polarization direction of the light is the same with the direction of the second polarizer 206 and the light is smoothly passing through. The passed light is the linearly polarized light after being polarized. When the electric field is applied, the liquid crystal layer 204 lost its rotatory capability, after the light emitted by the backlight module 201 through the first polarizer 202, the polarization direction of the light is perpendicular to the second polarizer 206 and cannot be passed, and having an image with the variation of the dark or light by by controlling the switches of the electric field. Thus, LCD displays 21 output of the two-dimensional image based on the linearly polarized light.

The light emitted from the second polarizer 206 is splitting by the stereoscopic module for naked eyes 22 and output of the three-dimensional image based on linearly polarized light. The Light conversion module 23 includes an adhesive layer 207, a first protective layer 208, a quarter-wave plate 209, a half-wave plate 210, and a second protective layer 211 sequentially laminated. Wherein the quarter-wave plate 209 and the half-wave plate 210 are interposed between the first protective layer 208 and the second protective layer 211 to have a protective effect. The material of the first protective layer 208 and the second protective layer 211 can be optionally the same or different materials. The quarter-wave plate 209 can realize converting the linearly polarized light into the circularly polarized light. The half-wave plate 210 is used as a wide view angle compensating plate. An optional the adhesive layer 207 can be selected for the adhesion of the first protective layer 208 and the stereoscopic module for naked eyes 22.

In can be understood that the stereoscopic display for naked eyes in the second embodiment of the present invention is take the two-dimensional display panel 21 as the LCD display 21 an example. The LCD display 21 outputs a two-dimensional image based on linearly polarized light. After the splitting of the stereoscopic module for the naked eyes 12 to output the three-dimensional image based on the linearly polarized light. By the quarter-wave plate 209 in the light conversion module 23 to achieve the conversion to the circularly polarized light. The human eye direct perception of circularly polarized light close to natural light, to alleviate the human visual fatigue and visual disturbances, achieve a healthy eye.

Figure 7:
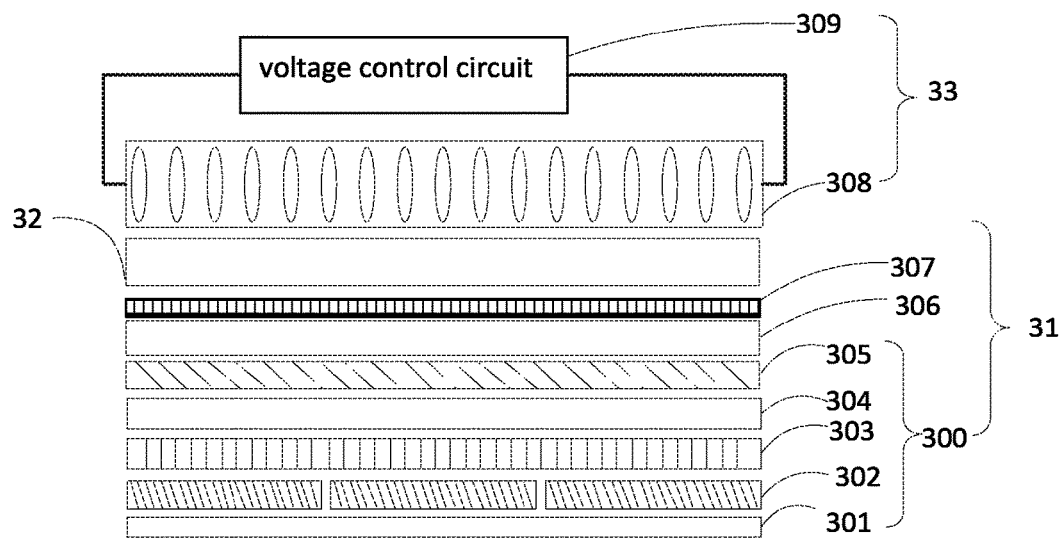
FIG. 7 is a schematic view of the structure of the stereoscopic display for naked eyes according to the third embodiment of the present application.

Referring to FIG. 7, is a stereoscopic display for naked eyes according to the third embodiment of the present application including a two-dimensional display panel 31, a stereoscopic module for naked eyes 32 and a light conversion module 33.

In particular, in this embodiment, the two-dimensional display panel 31 is an OLED display 300, a quarter-wave plate 306 and a polarizer 307. The quarter-wave plate 306 is disposed between the OLED display 300 and the polarizer 307.

Wherein, the OLED display 300 includes a substrate 301, an anode 302, a conductive layer 303, an emission layer 304 and a cathode 305 stacked in this order. The voltage is applied between the cathode 302 and the anode 300 of the OLED display 305. The electrons is flow from the cathode 305 to the anode 302. The electrons and holes are combined in the junction of the conductive layer 303 and the emitter layer 304. The electrons release energy in the form of photons and OLED display 300 emits light. Therefore, the OLED display 300 is a self-luminous organic electroluminescent device, which emitted not polarized light, but relatively close to natural light.

In the OLED display 300, the cathode 305 is typically made of a metal material of aluminum, having a high reflection characteristic. A reflection is formed after the entering of the ambient light, and interference the image signal. Therefore, in order to filter the influence of the reflected ambient light by the cathode 305 of the OLED display 300 and to improve the image quality. The quarter-wave plate 306 and the polarizer 307 is disposed on the OLED display 300 sequentially. The ambient light passes the polarizing plate 307 and forms the polarized light, and then pass through the quarter-wave plate 306 and becomes a right-handed circularly polarized light or a left-handed circularly polarized light. The circularly polarized light is reflected by the surface of the cathode 305 and convert into another circularly polarized light and pass the quarter-wave plate 306 again and form a perpendicular polarized light, and cannot pass the polarizing plate 307. After the reflection of the ambient light, no light is outputted, and thus will not affect the image quality.

By disposing the quarter-wave plate 306 and the polarizer 307 on the OLED display 300, since the light emitted from the OLED display is close to the natural light, and will not change after passing the quarter-wave plate 306. Then the light pass through the polarizer 307 and form the linearly polarized light, and finally output the two-dimensional image based on the linearly polarized light.

The light is splitting by the stereoscopic module for naked eyes 32, form a three-dimensional effect and output of the three-dimensional image based on linearly polarized light.

The Light conversion module 33 includes a liquid crystal type circularly polarization controller 33. The liquid crystal type circularly polarization controller 33 includes a voltage control circuit 309 and a liquid crystal cell 308.

The liquid crystal material has electrically controlled birefringence property. The modulation of the voltage of the liquid crystal cell 308 is controlled by the voltage control circuit 309. As the voltage changes from small to large, the birefringence Δn1 will have a monotonic changing curve. Assuming that the wavelength of the incident light is λ1, the thickness of the liquid crystal cell is d1. By the controlling of the AC voltage outputted from the voltage control circuit 309 and after the incident light pass through the liquid crystal cell 308, the phase difference is generated as $\delta=2\pi d1 \Delta n1/\lambda 1$. Modulating the AC voltage to make the δ is π/2. The incident light pass through the liquid crystal cell 308 and its phase difference will be π/2. In this embodiment, the incident light is the linearly polarized light output form the stereoscopic module for naked eyes 32, the linearly polarized light pass the liquid crystal cell 308 and output a circularly polarized light and finally output the three-dimensional image based on circularly polarized light.

In can be understood that the stereoscopic display for naked eyes in the third embodiment of the present invention is by the self emitting light from the OLED device 300, the self emitting light pass the quarter-wave plate 306 and the polarizer 307 then output a two-dimensional image based on linearly polarized light. After the splitting of the stereoscopic module for the naked eyes 32 to achieve the three-dimensional image based on the linearly polarized light. The light is further converted by the liquid crystal type circularly polarization controller 33 and output a three-dimensional image based on the circularly polarized light. The human eye direct perception of circularly polarized light, to alleviate the human visual fatigue and visual disturbances, achieve a healthy eye.

Above are embodiments of the present application, which does not limit the scope of the present application. Any modifications, equivalent replacements or improvements within the spirit and principles of the embodiment described above should be covered by the protected scope of the invention.

What is claimed is:

1. A stereoscopic display for naked eyes, comprising:
a two-dimensional display panel, a stereoscopic module for the naked eyes and a light converting module, wherein the stereoscopic module for the naked eyes is deposited between the two-dimensional display panel and the light converting module;
the two-dimensional display panel is used to output a two-dimensional image based on the linearly polarized light;
the stereoscopic module for the naked eyes is used to output a three-dimensional image based on the linearly polarized light; and
the light converting module is used to convert the linearly polarized light to a circularly polarized light and output a three-dimensional image based on the circularly polarized light, wherein the light converting module further comprising at least one quarter-wave plate, and the quarter-wave plate convert the linearly polarized light to a circularly polarized light, and the quarter-wave plate satisfies the phase delay formula:

$$\frac{2\pi}{\lambda} * \Delta n * d = \frac{\pi}{2}, \text{ such as } \Delta n = \frac{\lambda}{4*d}$$

wherein λ is the wavelength of the linearly polarized light, Δn is the difference of the refractive index, d is the thickness of the quarter-wave plate; and
wherein the light converting module does not include any image display device.

2. The stereoscopic display for naked eyes according to claim 1, wherein the light converting module further comprising an adhesive layer, a first protective layer, a quarter-wave plate, a half-wave plate, and a second protective layer sequentially laminated.

3. The stereoscopic display for naked eyes according to claim 1, wherein the difference of the refractive index of the quarter-wave plate is positively correlated with the wavelength of the linearly polarized light.

4. The stereoscopic display for naked eyes according to claim 1, wherein the light converting module is a liquid crystal type circularly polarization controller and the liquid crystal type circularly polarization controller further comprising a voltage control circuit and a liquid crystal cell;
the voltage control circuit is modulated the voltage of the liquid crystal cell to convert the inputted linearly polarized light into a circularly polarized light by the liquid crystal cell.

5. The stereoscopic display for naked eyes according to claim 1, wherein light converting module comprises one of a slit, a cylindrical lens or a liquid crystal lens.

6. The stereoscopic display for naked eyes according to claim 1, wherein the two-dimensional display panel is a LCD display, and the LCD display comprising a backlight module, a first polarizer, a first substrate, a liquid crystal layer, a second substrate, a second polarizer;
the first polarizer is positioned between the backlight module and the first substrate; the second polarizer is located between the second substrate and the stereoscopic module for naked eyes; and the liquid crystal layer is filled between the first substrate and the second substrate.

7. The stereoscopic display for naked eyes according to claim 6, wherein the first substrate is a thin-film transistor array substrate and the second substrate a color filter substrate.

8. The stereoscopic display for naked eyes according to claim 1, wherein the two-dimensional display panel is an OLED display, a quarter-wave plate and a polarizer; the quarter-wave plate is disposed between the OLED display and the polarizer.

9. The stereoscopic display for naked eyes according to claim 1, wherein the OLED display comprising a substrate, an anode, a conductive layer, an emission layer and a cathode stacked in this order.

10. The stereoscopic display for naked eyes according to claim 1, wherein the two-dimensional display panel is directly in contact with the stereoscopic module for the naked eyes and the light converting module, respectively.

11. The stereoscopic display for naked eyes according to claim 10, wherein the stereoscopic module for the naked eyes comprises one of a slit, a cylindrical lens or a liquid crystal lens;
the two-dimensional display panel is a LCD display or an OLED display; and
the light converting module comprises one of a quarter-wave plate or a liquid crystal type circularly polarization controller.

12. The stereoscopic display for naked eyes according to claim 1, wherein the stereoscopic module for the naked eyes comprises one of a slit, a cylindrical lens or a liquid crystal lens;
the two-dimensional display panel is a LCD display or an OLED display; and
the light converting module comprises one of a quarter-wave plate or a liquid crystal type circularly polarization controller.

13. The stereoscopic display for naked eyes according to claim 1, wherein the light converting module does not comprise a polarizer.

* * * * *